United States Patent [19]

Kudo et al.

[11] Patent Number: 4,535,739
[45] Date of Patent: Aug. 20, 1985

[54] SYSTEM FOR PREVENTING KNOCKING IN A COMBUSTION ENGINE

[75] Inventors: Ichiro Kudo, Higashikurume; Yoshiaki Kasai, Kiyose; Masaharu Yuasa, Fujisawa, all of Japan

[73] Assignee: Fuji Jukogyo Kabushiki Kaisha, Tokyo, Japan

[21] Appl. No.: 611,274

[22] Filed: May 17, 1984

[30] Foreign Application Priority Data

May 19, 1983 [JP] Japan .................................. 58-88070

[51] Int. Cl.³ ............................................... F02P 5/04
[52] U.S. Cl. ...................................... 123/425; 123/435
[58] Field of Search ................................ 123/425, 435

[56] References Cited

U.S. PATENT DOCUMENTS 2,220,558 11/1940 Van Dijck ........................... 123/425
2,407,652 9/1946 Costa ................................... 123/428
2,507,988 5/1950 McMillan ............................ 123/435

FOREIGN PATENT DOCUMENTS 55-19978 1/1978 Japan ................................... 123/425

Primary Examiner—Ronald B. Cox
Attorney, Agent, or Firm—Martin A. Farber

[57] ABSTRACT

A system is provided with a sensor for sensing the vibration of the engine, and control means responsive to an output of the sensor at a condition of knocking in the engine and for producing a knock signal. A control means is provided responsive to the knock signal for enriching the air-fuel mixture supplied to the engine so as to prevent the knocking. The system further comprises an ignition timing control system responsive to the knock signal for retarding the ignition timing.

6 Claims, 11 Drawing Figures

FIG. 4
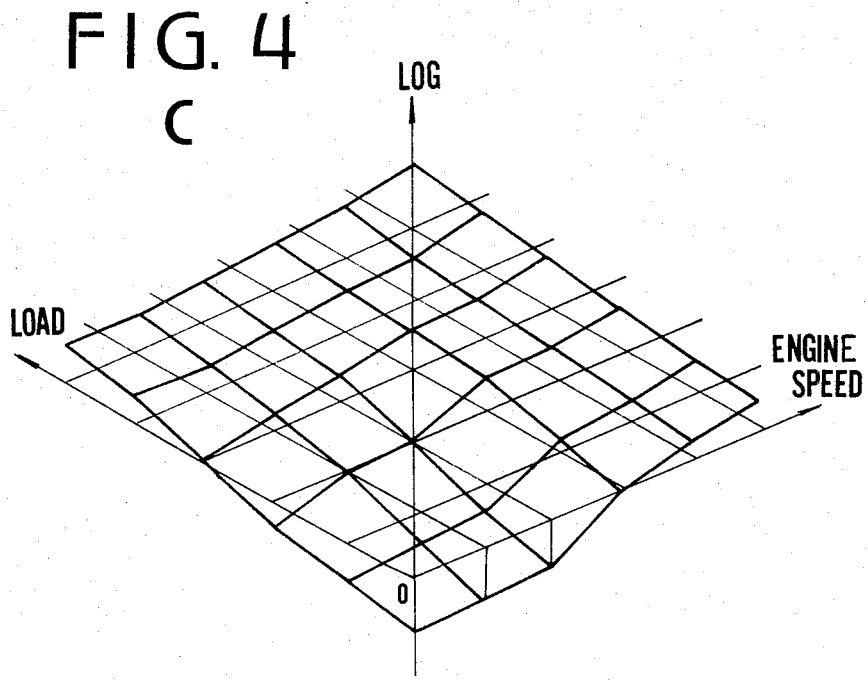
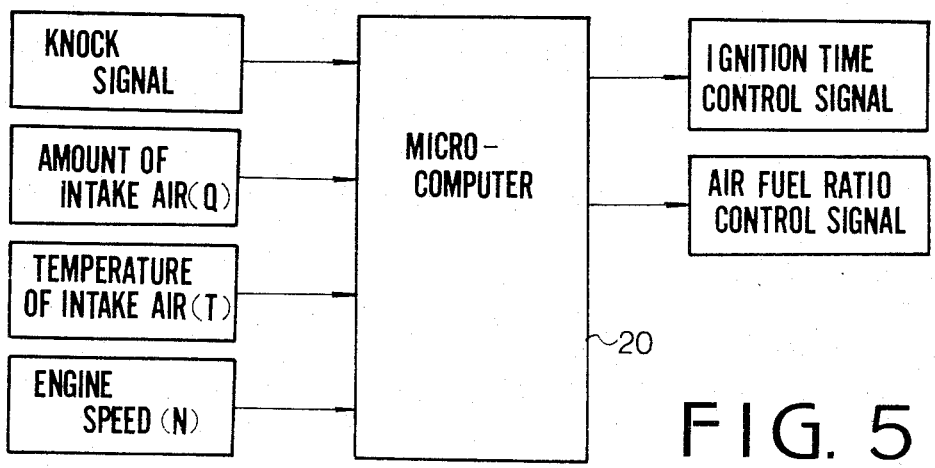
FIG. 5

SYSTEM FOR PREVENTING KNOCKING IN A COMBUSTION ENGINE

BACKGROUND OF THE INVENTION

The present invention is to provide a system and method for preventing knocking or fuel knocking in an internal combustion engine.

Fuel knocking or detonation is an uncontrolled second explosion after the spark occurs at the spark plug. Generally, the tendency for an engine to experience detonation increases with an increase of the compression ratio of the engine.

In order to prevent this detonation, a system for retarding the ignition timing is proposed, for example in Japanese patent application laid open 55-19978. However, by such an ignition timing control method, particular conditions exist under which detonation can not be prevented, even if the ignition timing is retarded to a full retard. In order to prevent the detonation in such particular conditions, a spark timing adjusting device must be designed to shift a base ignition timing (such a timing that the pressure during combustion reaches a maximum value at approximately 10° after the top dead center) in the retard direction so as to allow more retardation or designed to increase the range of the retardation in the retard direction. Such a large retardation of the ignition timing causes a decrease of power of the engine and poor fuel consumption.

SUMMARY OF THE INVENTION

The object of the present invention is to provide a system and method which prevents knocking in an internal combustion engine without decreasing the power of the engine.

To this end, the system and method of the present invention are so arranged to enrich the air-fuel mixture supplied to an engine and to retard the ignition timing at a time when knocking occurs. By the enrichment the mixture in the cylinders is cooled by an increased amount of fuel and evaporation heat to prevent continuous knocking.

The above and other objects and features of this invention will be apparently understood from the following description with reference to the accompanying drawings.

BRIEF DESCRIPTION OF DRAWINGS

FIGS. 4a to 4c show the relationship between enrichment control and ignition timing control.

FIG. 5 is a block diagram showing another embodiment of the present invention.

DETAILED DESCRIPTION OF THE PREFERRED EMBODIMENTS

Figure 1:
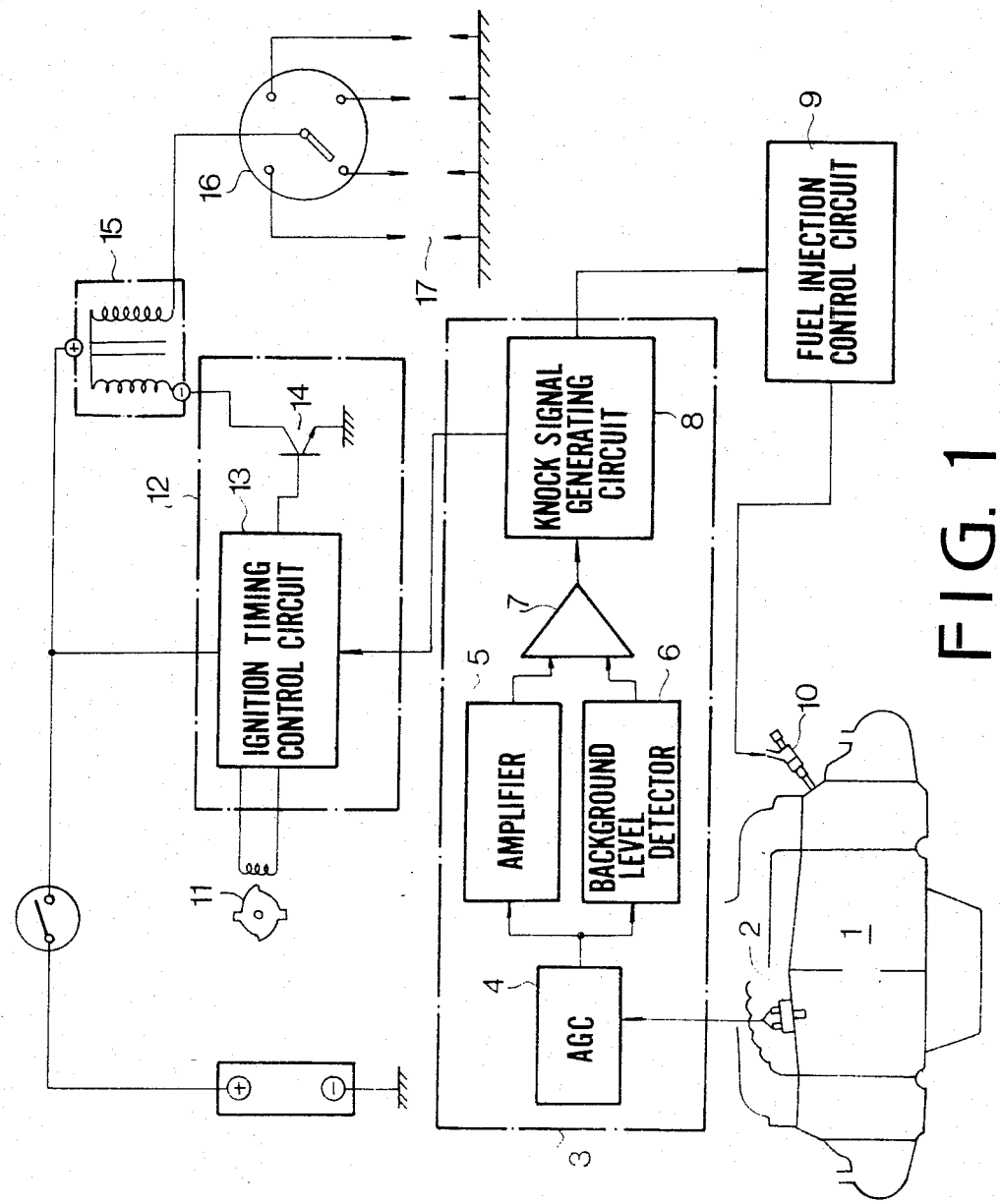
FIG. 1 is a schematic diagram showing an embodiment of the present invention.

Referring to FIG. 1, an internal combustion engine 1 is provided with a fuel knock sensor 2 which is arranged to detect the frequency caused by knocking and to produce a signal. The signal is applied to a control circuit 3. The control circuit 3 comprises an automatic gain control (AGC) 4, an amplifier 5 and a, reference value or background level detector 6 connected in parallel and to the output of the AGC 4, a comparator 7 connected to the outputs of the amplifier 5 and background level detector 6, and a knock signal generating circuit 8 connected to the comparator. The background level detector 6 detects a reference level when the output of the AGC 4 exceeds a predetermined value. The comparator 7 compares the output of the amplifier 5 with the output of the background level detector 6 and produces an output signal when the output of the amplifier 5 exceeds the predetermined value. In response to the output signal, the circuit 8 produces a knock signal which is applied to a fuel injection control circuit 9. The fuel injection control circuit 9 produces a mixture enrich signal for enriching the air-fuel mixture in dependency on the knock signal and other conditions such as the amount of air flow, engine speed, coolant temperature and others.

Figure 2:
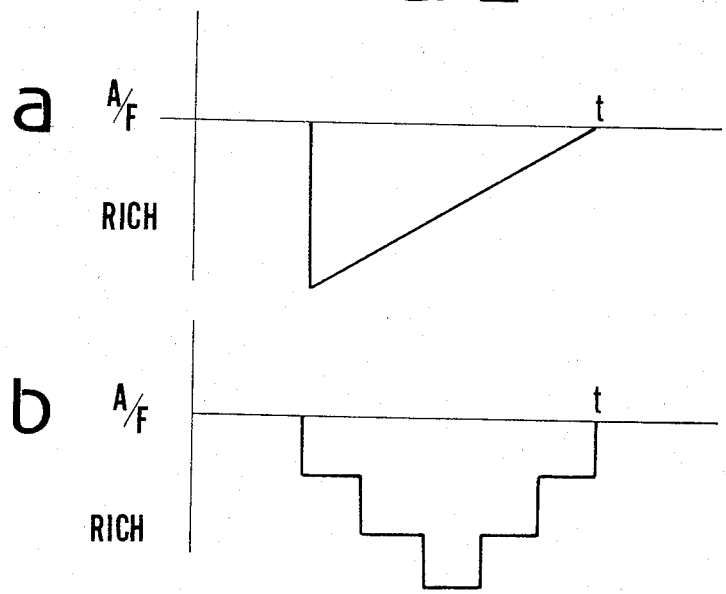
FIGS. 2a and 2b are graphs showing control patterns to enrich air-fuel mixture.
Figure 3:
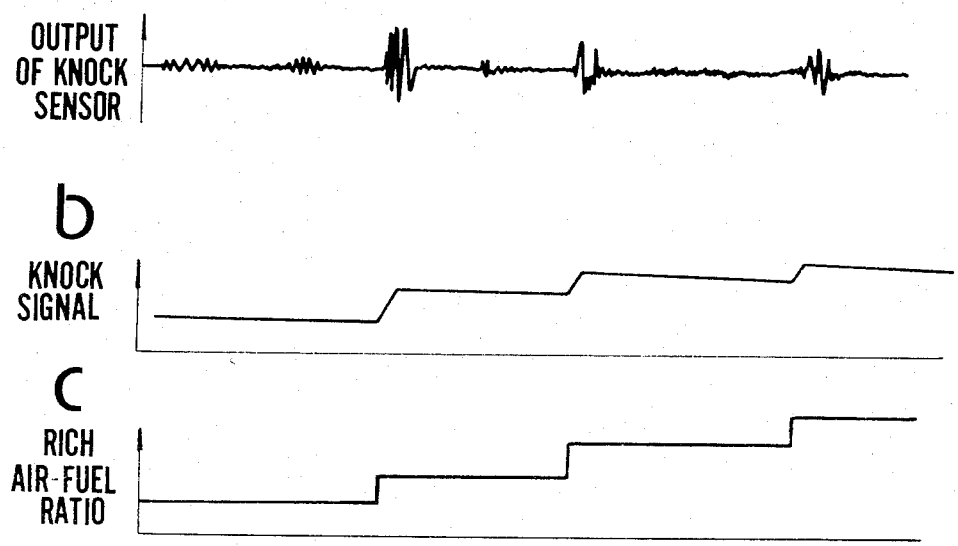
FIGS. 3a to 3c show waveforms at various points in FIG. 1.

The mixture enrich signal may have various control patterns. FIGS. 2a and 2b show examples of the control pattern. The signal of FIG. 2a has a peak level dependent on the level of the knock signal and decreases with the lapse of time. The level of signal of FIG. 2b rises stepwise at every occurrence of knocking so as to enrich the mixture little by little and reduces stepwise in the same manner when the knocking disappears. FIG. 3 shows waveforms by the control method of FIG. 2b. FIG. 3a shows an output of the knock sensor 2 and FIG. 3b shows a knock signal from the knock signal generating circuit 8. By such a knock signal, the air-fuel ratio varies as shown in FIG. 3c. The enriched mixture has a lower temperature and a higher volatility. Accordingly, the temperature of the induced mixture decreases, so that knocking can be prevented or suppressed.

Knocking can be more effectively prevented by combining the ignition timing control method with the mixture enrichment method of the present invention. The system of FIG. 1 includes an ignition timing control system. The control system comprises an engine speed sensor 11, an electronic ignition timing control unit 12, an ignition coil 15 and a distributor 16 for spark plugs 17. The knock signal from the knock signal generating circuit 8 is applied to an ignition timing control circuit 13 in the control unit 12. In response to the knock signal, the ignition timing control circuit 13 produces a control signal which is applied to a base of a driving transistor 14. Thus, the timing of the current passing through the ignition coil 15 is controlled to retard the ignition timing in dependency on the knock signal. Accordingly, knocking can be effectively prevented by controlling the air-fuel ratio and ignition timing.

Figure 4A:
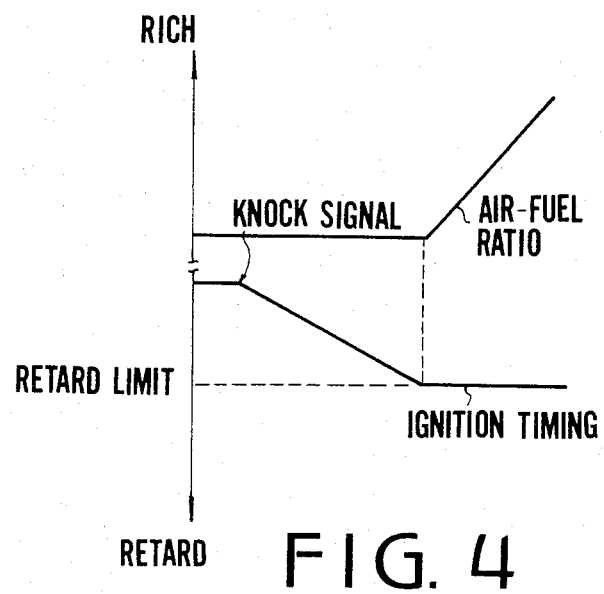

FIG. 4a shows a control method in which the ignition timing is controlled in preference to the mixture enrichment. By the knock signal, the ignition timing is retarded first. If knocking still occurs when the ignition timing is retarded to a limit, the mixture is enriched. In accordance with such a combined control manner, the range of control for preventing knocking can be expanded. Accordingly, it is possible to set the standard ignition timing to a point near the MBT (Minimum advance for Best Torque) thereby improving the power and fuel consumption of an engine.

Figure 4B:
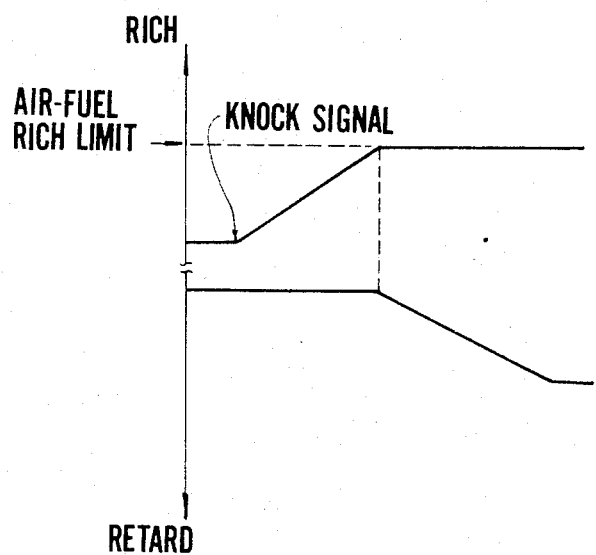

FIG. 4b shows a fuel enrichment control in preference to the ignition timing control. In the control mode, the mixture is enriched first. After that, the ignition timing is retarded. In accordance with this control manner, knocking can be prevented without decreasing the power of the engine in the operational range in which a large power is required.

FIG. 4c shows a map for a simultaneous control in which the ignition timing and fuel enrichment are alternately or simultaneously controlled.

Figure 6:
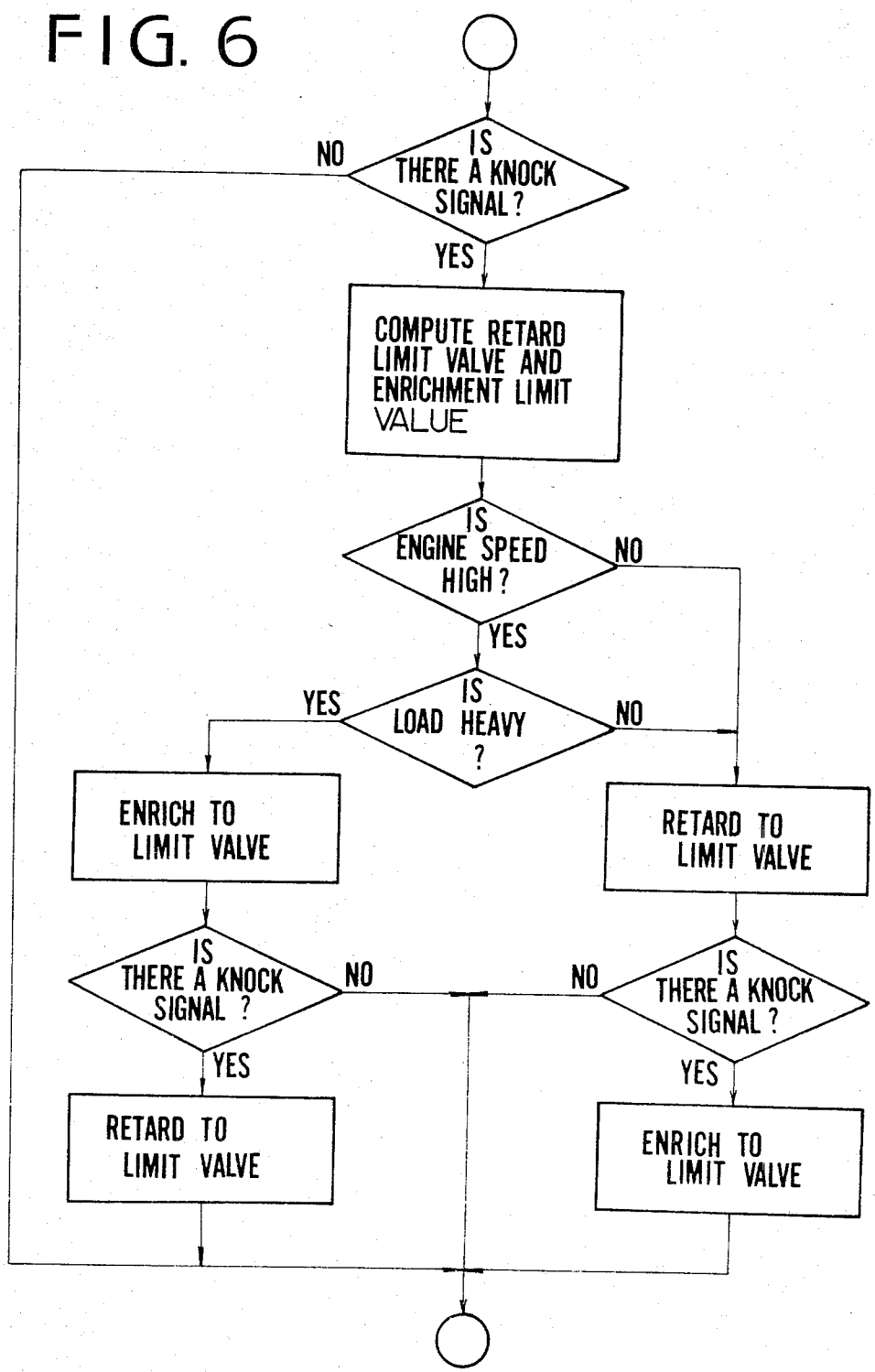
FIG. 6 is a flowchart showing the operation of the system of FIG. 5.

FIG. 5 shows another embodiment comprising a microcomputer 20. The microcomputer 20 is applied with a knock signal, amount of intake air (Q), temperature of intake air (T) and engine speed (N), and is adapted to produce an ignition time control signal and an air-fuel ratio control signal dependent on the input signals. The operation of the system is described in the flowchart of FIG. 6. The microcomputer responds to a knock signal, and computes a retard limit value and an enrichment limit value as a function of values Q, T and N with reference to a table data. At high engine speed and heavy load, the mixture is enriched to the limit value. If the knocking is not suppressed by the enrichment, the ignition timing is retarded to the limit value. To the contrary, at low engine speed and light load, the ignition timing is retarded in preference to the air-fuel ratio control. Thus, the air-fuel ratio and ignition timing are controlled in dependency on engine operating conditions so as to effectively preventing knocking without impairing the power and fuel consumption of the engine.

While the present preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. A method for preventing knocking in a combustion engine comprising:
    sensing conditions of knocking in said engine for producing a knock signal;
    computing limit values of retardation of ignition timing and of enrichment of air-fuel mixture in response to said knock signal, with reference to engine speed and amount of intake air;
    enriching the mixture to the respective limit value at high engine speed and heavy load and then retarding the ignition timing to the respective limit value; and
    retarding the ignition timing to the respective limit value at low engine speed and light load and then enriching the mixture to the respective limit value.

2. A method for preventing knocking in a combustion engine comprising:
    sensing conditions of knocking in said engine for producing a knock signal;
    computing limit values of retardation of ignition timing and of enrichment of air-fuel mixture in response to said knock signal, with reference to engine speed and amount of intake air;
    determining whether engine speed is high or low;
    determining whether load on the engine is heavy or light;
    enriching the mixture to the respective limit value at high engine speed and heavy load, and retarding the ignition timing to the respective limit value when the knock signal continues to occur; and
    retarding the ignition timing to the respective limit value at low engine speed and light load, and enriching the mixture to the respective limit value when the knock signal continues to occur.

3. A system for preventing knocking in a combustion engine comprising:
    means for sensing conditions of knocking in said engine for producing a knock signal;
    means for computing limit values of retardation of ignition timing and of enrichment of air-fuel mixture in response to said knock signal, with reference to engine speed and amount of intake air;
    means for enriching the mixture to the respective limit value at high engine speed and heavy load and then retarding the ignition timing to the respective limit value; and
    means for retarding the ignition timing to the respective limit value at low engine speed and light load and then enriching the mixture to the respective limit value.

4. A system for preventing knocking in a combustion engine comprising:
    sensing means for sensing vibration of said engine;
    control means responsive to an output of said sensing means at a condition of knocking in said engine and for producing a knock signal;
    load detecting means responsive to amount of intake air and engine speed or producing a load signal;
    means responsive to said load signal at heavy load for enriching the air-fuel mixture supplied to said engine; and
    an ignition timing control system responsive to said load signal at light load for retarding the ignition timing.

5. The method according to claim 1, wherein said knock signal is produced by the steps of
    sensing conditions of knocking in said engine for producing a first signal, and
    comparing said first signal with a reference value for producing knock signal when the first signal exceeds the reference value.

6. The method according to claim 2, wherein said knock signal is produced by the steps of
    sensing conditions of knocking in said engine for producing a first signal, and
    comparing said first signal with a reference value for producing knock signal when the first signal exceeds the reference value.

* * * * *